United States Patent [19]

Lundquist

[11] 3,974,802

[45] Aug. 17, 1976

[54] INTERNAL COMBUSTION ENGINE

[76] Inventor: Hendrik W. Lundquist, Sunland, Calif. 91352

[22] Filed: Jan. 20, 1975

[21] Appl. No.: 542,367

Related U.S. Application Data

[63] Continuation-in-part of Ser. No. 389,372, Aug. 17, 1973, abandoned.

[52] U.S. Cl. .......................... 123/25 R; 123/122 D
[51] Int. Cl.$^2$ ........................................ F02D 19/00
[58] Field of Search .............. 123/25 R, 25 B, 25 D, 123/25 F, 25 P, 122 D, 122 C, 122 E

[56] References Cited
UNITED STATES PATENTS

| | | | |
|---|---|---|---|
| 1,470,461 | 10/1923 | Maclean | 123/122 E |
| 2,197,503 | 4/1940 | Martin | 123/122 D |
| 2,756,730 | 7/1958 | Patchan | 123/122 D |
| 2,897,801 | 8/1959 | Kloss | 123/122 D |
| 2,996,052 | 8/1961 | Murphy | 123/122 E |
| 3,717,129 | 2/1973 | Fox | 123/25 B |

FOREIGN PATENTS OR APPLICATIONS 551,387  4/1923  France ................................ 123/25

*Primary Examiner*—Charles J. Myhre
*Assistant Examiner*—R. H. Lazarus
*Attorney, Agent, or Firm*—Robert M. Vargo

[57] ABSTRACT

An internal combustion engine is disclosed having more efficient combustion to greatly reduce the exhaust emissions. The internal combustion engine comprises an air-cooled two cycle engine having a relatively longer piston stroke (approximately 6 inches) and a relatively slower operating speed (approximately 2,800 rpm) than present day internal combustion engines. The engine also includes a heat exchanger or a thermostatically controlled heating element for preheating and vaporizing the gasoline as it enters the combustion chambers. Air for the combustion chambers of the engine is also preheated by means of a fan which draws the air over the cooling fins on the engine block and forces the air heated by contact with the fins into an intake manifold. A heat exchanger is also provided to contain and heat a quantity of water until it turns to steam. The steam is then introduced into the air intake manifold to be introduced into the combustion chambers along with the air. This mixture of hot air, steam and vaporized gas will completely burn within the longer stroke, slower speed engine construction to thereby greatly reduce exhaust emissions that contribute to smog.

6 Claims, 5 Drawing Figures

INTERNAL COMBUSTION ENGINE

CROSS REFERENCE TO RELATED APPLICATION

This application is a continuation-in-part of U.S. Pat. Application Ser. No. 389,372 filed Aug. 17, 1973 now abandoned.

BACKGROUND OF THE INVENTION

1. Field of the Invention

The present invention relates generally to combustion engines and more particularly to controls for reducing the emissions from the engine exhausts.

2. Description of the Prior Art

In the development of the internal combustion engine for automotive use, the engine has progressed to a high speed reciprocating piston engine having a relatively short piston stroke in the cylinder. In a conventional automobile piston engine, the piston stroke is approximately three inches and the engine operating speed approaches 4800 revolutions per minute. Although such engines are the models of automotive sophistication, a serious shortcoming with such high speed, short stroke engine is that very little of the fuel mixture is burned within the cylinders. The unburned portion of the fuel is emitted from the engine exhausts to contaminate the atmosphere.

Moreover, gasoline manufacturers have added to the smog problem by adding detergents and other chemicals to the gasoline. Although these additives have helped in eliminating engine knock and other problems, a very large percentage of these additives also are expelled into the atmosphere in an unburned condition.

One proposal for reducing emissions is to utilize natural gas in our automobile engines. However, the cost of conversion and the inconvenience in implementing a natural gas system would be prohibitive.

Another proposal for reducing emissions is to preheat and vaporize the gasoline as it enters the intake manifold of the engine. Although such a modification would be advantageous, gasoline vaporization alone will not be sufficient to reduce emissions to an acceptable degree.

SUMMARY OF THE INVENTION

The present invention obviates the above-mentioned shortcomings by providing an internal combustion engine that can greatly reduce exhaust emissions by having the combustion within the cylinder more complete.

In its broadest aspect, the present invention relates to an internal combustion engine having a mixture of preheated fuel, air and water admitted into the combustion chambers of the engine. The air is preheated by drawing air over the cooling fins of the engine block and forcing it into the intake manifold. The vaporizing of the fuel functions to ensure more efficient combustion while the superheated steam and preheated air function to add additional hydrogen and oxygen to the combustion mixture.

Further aspects of the present invention are that the engine is an air-cooled two-cycle engine in which the pistons have a relatively longer stroke (6 inches) and operate at relatively slower speeds (2400 to 3000 rpm) than present day engines. The advantage of the engine of the present invention is that the fuel burning time is increased to enhance complete combustion and the piston travel is greatly increased to produce more power than present day four-cycle engines.

The features of the present invention which are believed to be novel are set forth with particularity in the appended Claims. The present invention, both as to its organization and manner of operation, together with the further advantages thereof, may best be understood by reference to the following description, taken in connection with the accompanying drawings.

DETAILED DESCRIPTION OF THE PREFERRED EMBODIMENT

Figure 1:
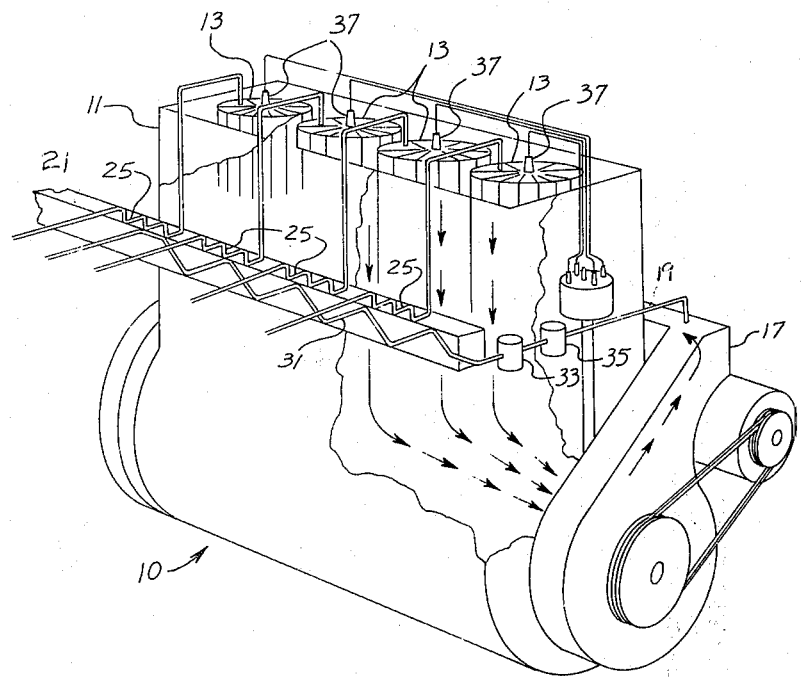
FIG. 1 is an elevational view of an air-cooled, internal combustion engine made in accordance with the present invention.

Referring now to the drawings, FIG. 1 illustrates an internal combustion engine, generally indicated by arrow 10, comprising an engine block 11 housing four cylinder heads 13. A plurality of vertically arranged cooling fins 53 are mounted on the sides of the cylinder heads 13. A fan 17 is mounted on the front of the engine 10 and is adapted to draw air into an air intake manifold 19. The air is drawn through the engine block 11 around the cylinder heads 13 to be preheated by contact with the fins 53. An exhaust manifold 21 is also provided on the one side of the engine block 11 to receive the spent products of combustion from each of the cylinder heads 13 and exhaust the spent products through the various filtering means (not shown) and finally into the atmosphere. The exhaust manifold functions as a heat exchanger for preheating the gasoline and a water supply.

A plurality of coils 25 are provided to conduct a quantity of fuel supplied from a fuel tank (not shown) into the heat exchanger 21 and finally into a plurality of fuel injectors 27 mounted on the cylinder head 13.

The heat exchanger 21 also has a tubing conduit 31 in a heat-exchange relationship to receive a quantity of water. The water that is heated in the heat exchanger 21 is converted into steam and exits the heat exchanger 21 through the conduit 31 to be drawn into the air intake manifold 19. A thermostatic valve 33 is positioned across conduit 31 to insure that only steam at a predetermined temperature passes therethrough. A solenoid valve 35 is also positioned across the conduit 31 and is interconnected to the ignition system in order to be actuated so that the cylinder will not be flooded with water when the engine has cooled off. A plurality of spark plugs 37 is also mounted on the cylinder heads 13.

FIGS. 2, 3, 4 and 5 illustrate schematically the operation of one of the piston-cylinder arrangements 13 located in the interior of the engine 10. The piston-cylinder arrangement 13 is a fan-scavenged two-stroke engine comprising a cylinder 39 having the spark plug 37 located on the cylinder head 41. The cylinder 39 has a piston 43 reciprocally mounted therein which is connected via a pair of linkages 45 and 47 to a crank shaft 49. The linkages 45 and 47 function to translate the reciprocatory motion of the piston 43 into rotary motion of the crank shaft 49.

An exhaust port 51 communicates with the interior of the cylinder 39 at a point just below a plurality of cooling fins 53. An inlet port 55 also communicates with the interior of the cylinder 39 by extending through the wall of the cylinder 39 at a point located below the point where the exhaust port 51 is located. The inlet port 55 functions as an air-steam intake port and communicates via a conduit 57 with the air intake manifold 19. As described above, fuel injector 27 receiving the preheated fuel is located at the top of each cylinder head. It is important to note that as the preheated fuel enters the cylinder 39 it immediately vaporizes.

Figures 2, 3, 4, 5:
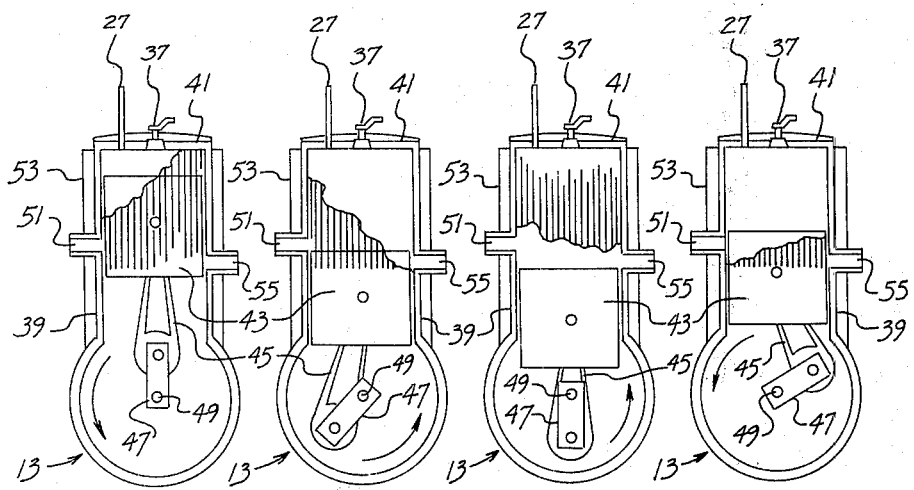
FIGS. 2, 3, 4 and 5 are schematic views showing the various cycles of one piston-cylinder arrangement of the internal combustion of the present invention.

In operation, the piston-cylinder arrangement 13 functions as a two-stroke engine, as shown in FIG. 2, as the piston 43 moves upwardly to cut off the inlet port 55 and then to cut off the exhaust port 51. The mixture of vaporized gas, steam and air is compressed until the piston 43 reaches the top of its stroke. At that point (FIG. 3) the spark plug 37 is ignited to combust the mixture to force the piston 43 downwardly. As the piston 43 moves past the exhaust port 51, see FIG. 4, the combusted mixture exhausts therethrough. Piston 43 then continues to travel downwardly to open the inlet port 55 to take in a fresh charge of steam and air. This is shown in FIG. 5. The vaporized fuel is not admitted until after the piston 43 cuts off the exhaust port 51 during its upward travel. The process is then repeated as discussed above.

It should be noted at this point that the linkages 45 and 47 and the size of the piston 43 and cylinder 39 are dimensioned to enable the piston travel to be approximately 6 inches. Moreover, the timing of the engine is set to enable the piston 43 to reciprocate at approximately 2800 revolutions per minute. This longer stroke and slower operating speed enables the fuel-steam-air mixture to completely combust within the cylinder 39 prior to being exhausted out of the cylinder 39 into the atmosphere.

It should also be noted that the preferred fuel is pure gasoline without any of the additives common in today's commercial fuel. It has been found that an engine operating under the parameters described above operates efficiently, smoothly and quietly, and more importantly, in a much cleaner manner. As a result the exhaust emissions are much lower in the smog contributing emissions than heretofore possible.

It should be noted that various modifications can be made to the apparatus while still remaining within the purview of the following claims.

What is claimed is:

1. An air cooled internal combustion engine, having at least one combustion chamber, said combustion chamber having cooling fins located on the exterior thereof, comprising:
    means for admitting fuel into each combustion chamber;
    means for preheating said fuel prior to entering each combustion chamber to enable said fuel to vaporize as it enters said combustion chamber, said means for preheating said fuel comprising a heat exchanger positioned within the exhaust manifold of the engine;
    means for admitting water into each combustion chamber;
    means for preheating said water prior to entering each combustion chamber to enable said water to vaporize as it enters said combustion chamber, said means for preheating said water comprising a heat exchanger positioned within the exhaust manifold of the engine; and
    means for admitting air into each combustion chamber and means for preheating the air prior to entering said combustion chamber, said means comprising a fan for drawing air through an area adjacent the cooling fins of the combustion chamber and forcing said air heated by contact with the fins into said air admitting means.

2. The combination of claim 1 wherein the combustion chambers of said internal combustion engine operate on a two-cycle basis which includes an intake-compression cycle and combustion-exhaust cycle.

3. The combination of claim 2, wherein each combustion chamber comprises an exhaust port located horizontally above said air and water admitting means.

4. The combination of claim 1 wherein each combustion chamber includes a piston reciprocally mounted therein, each piston having a drive linkage dimensioned to enable said piston to have a stroke of 6 inches.

5. The invention of claim 4, wherein said admission, ignition and exhaust means are timed to enable each piston to reciprocate at 3000 revolutions per minute.

6. The combination of claim 1 further including an outer shell positioned around each finned combustion chamber to provide a passage for the air to pass as it contacts the cooling fins of the combustion chamber as it is drawn into the fan.

* * * * *